United States Patent [19]

Robbins, III

[11] Patent Number: 5,392,941
[45] Date of Patent: Feb. 28, 1995

[54] REUSABLE AND RE-COLLAPSIBLE CONTAINER AND ASSOCIATED CAP

[76] Inventor: Edward S. Robbins, III, 2802 E. Avalon Ave., Muscle Shoals, Ala. 35661

[21] Appl. No.: 227,545

[22] Filed: Apr. 14, 1994

Related U.S. Application Data

[63] Continuation-in-part of Ser. No. 47,185, Apr. 16, 1993, which is a continuation-in-part of Ser. No. 12,122, Feb. 1, 1993, abandoned, which is a continuation-in-part of Ser. No. 789,838, Nov. 12, 1991, Pat. No. 5,226,551.

[51] Int. Cl.⁶ .............................................. B65D 6/12
[52] U.S. Cl. ......................................... 220/8; 220/666
[58] Field of Search ................................... 220/8, 666

[56] References Cited

U.S. PATENT DOCUMENTS

| | | |
|---|---|---|
| 1,048,935 | 12/1912 | Brady . |
| 2,784,882 | 3/1957 | Du Bois . |
| 2,880,902 | 4/1959 | Owsen . |
| 2,899,110 | 8/1959 | Parker . |
| 2,985,915 | 5/1961 | Winstead . |
| 3,143,429 | 8/1964 | Swanson et al. . |
| 3,156,383 | 11/1964 | Melli . |
| 3,220,544 | 11/1965 | Lovell . |
| 3,301,293 | 1/1967 | Santelli . |
| 3,467,283 | 9/1969 | Kinnavy . |
| 3,494,509 | 2/1970 | McGuire . |
| 3,608,268 | 9/1971 | Lauritzen . |
| 3,707,241 | 12/1972 | Taylor . |
| 3,864,771 | 2/1975 | Bauer et al. . |
| 3,875,941 | 4/1975 | Adair . |
| 3,939,888 | 2/1976 | Scarnato . |
| 4,087,024 | 5/1978 | Martin et al. . |
| 4,428,507 | 1/1984 | Sneider . |
| 4,456,134 | 6/1984 | Cooper . |
| 4,492,313 | 1/1985 | Touzani . |
| 4,706,829 | 11/1987 | Li . |
| 4,712,699 | 12/1987 | Lutz . |
| 4,775,564 | 10/1988 | Shriver et al. . |
| 4,815,615 | 3/1989 | Phlaphongphanich . |
| 4,844,273 | 7/1989 | Hawkins . |
| 4,846,376 | 7/1989 | Palmer . |
| 4,865,211 | 9/1989 | Hollingsworth . |
| 4,873,100 | 10/1989 | Dirksing et al. . |
| 4,875,576 | 10/1989 | Torgrimson et al. . |
| 4,892,126 | 1/1990 | Bucheler et al. . |
| 4,925,055 | 5/1990 | Robbins, III et al. . |
| 4,955,493 | 9/1990 | Touzani . |
| 4,979,628 | 12/1990 | Robbins, III . |
| 5,226,551 | 7/1993 | Robbins, III ........................ 220/666 |

FOREIGN PATENT DOCUMENTS

| | | |
|---|---|---|
| 587701 | 8/1924 | France . |
| 1301970 | 8/1969 | Germany . |
| 2340967 | 3/1974 | Germany . |
| 3937456A | 5/1991 | Germany . |
| 4-102544A | 4/1992 | Japan . |
| 2109247A | 6/1983 | United Kingdom . |
| 2138525A | 10/1984 | United Kingdom . |
| WO88/05014 | 7/1988 | WIPO . |

*Primary Examiner*—Joseph Man-Fu Moy
*Attorney, Agent, or Firm*—Nixon & Vanderhye

[57] ABSTRACT

A reusable collapsible container includes a bottom wall and a relatively flexible, peripheral side wall extending upwardly from the bottom wall, the side wall movable between axially extended and collapsed positions. The side wall includes lower and upper relatively thicker portions and an intermediate relatively thinner portion, and the upper portion joins with an annular rim adapted to receive a removable cap. The intermediate side wall portion is tapered radially inwardly and downwardly, and the lower side wall portion is tapered radially outwardly and downwardly substantially to the bottom wall, such that in a collapsed position, the lower side wall portion is partially telescoped within the upper side wall portion, with the intermediate portion reverse folded therebetween.

5 Claims, 7 Drawing Sheets

REUSABLE AND RE-COLLAPSIBLE CONTAINER AND ASSOCIATED CAP

RELATED APPLICATIONS

This application is a continuation-in-part of copending application Ser. No. 08/047,185, filed Apr. 16, 1993, which is a continuation-in-part of application Ser. No. 08/012,122, filed Feb. 1, 1993, now abandoned, which in turn is a continuation-in-part of application Ser. No. 07/789,838, filed Nov. 12, 1991, and now U.S. Pat. No. 5,226,551.

BACKGROUND AND SUMMARY OF THE INVENTION

This invention relates to reusable and re-collapsible containers, and particularly to a one-piece container construction having a peripheral side wall which is arranged to include at least three sections of differential wall thickness and diameter to thereby permit movement of the container from an extended to a collapsed position by reason of a telescoping relationship between the various sections of the peripheral side wall.

Collapsible containers, drinking cups and the like are, of course, well known. For example, in applicant's own prior U.S. Pat. No. 4,930,644, a collapsible, thin film plastic container is disclosed wherein a major portion of the container side wall has a reduced wall thickness to permit random collapse of the side wall. In U.S. Pat. No. 4,865,211, a plastic bottle having a uniform wall thickness throughout the side wall, is configured to permit collapsing of the container through telescoping movement of one portion of the side wall into another portion of the side wall.

In U.S. Pat. No. 4,875,576, a container is disclosed wherein an intermediate portion of the side wall incorporates a bellows-type arrangement for facilitating collapse and extension of the container. The patent also discloses the use of helical creases which spiral or angle between first and second portions of the container side wall to facilitate collapsing action of the creased portion of the side wall.

In U.S. Pat. No. 4,873,100, a bi-stable, expandable plastic bottle is disclosed which incorporates a bellows-type side wall for movement between collapsed and extended positions.

In U.S. Pat. No. 2,880,902, a collapsible, drinking cup (or camera bellows) is disclosed wherein the side wall is composed of alternating thick and thin portions.

The present invention incorporates a number of features not previously found in the prior art and which result in simple, easy-to-use, low cost containers which may be used and reused by the consumer as desired, and which may be stored in a collapsed condition, maximizing storage space, etc. At the same time, by significantly reducing the thickness of the container side wall in an intermediate portion thereof, source reductions in the amount of plastic required to manufacture the containers are realized.

More specifically, the invention provides in each of the variously disclosed embodiments, a one-piece, extruded and blow molded container formed with a peripheral side wall divided into upper, intermediate and lower portions, with the upper and lower portions having significantly greater wall thicknesses than the intermediate portion. For example, it was originally determined that the intermediate portion may have a wall thickness of between about 2 and about 12 mil, and preferably about 8 mil, which permits the intermediate portion to reverse fold as the upper and lower portions, which may each have a wall thickness in the range of about 25–60 mil and preferably about 45 mil, are moved toward one another in the aforementioned telescoping relationship.

It has now been determined that the wall thickness of the intermediate side wall portion can fall in the range of about 2 to about 20 mils, and that the wall thickness of both the upper and lower side wall portion can fall in the range of 25–75 mils or more. It will be recognized in any event that the thicknesses in each wall section will vary somewhat (circumferentially as well as axially) as a result of the plastic forming process, and the thicknesses here are to be regarded as average thicknesses within the specifically identified portions of the container.

It is also a feature of the invention that the peripheral side wall include surface configurations which facilitate the axial collapse and extension of the container. Thus, in each of the disclosed embodiments, the intermediate peripheral side wall portion is formed with an inwardly and downwardly tapered profile, i.e., a decreasing diameter in the downward direction; and the lower peripheral side wall portion is formed with a downwardly and outwardly tapered profile, i.e., an increasing diameter in the downward direction. In addition, at the interface between the three sections, the changes in wall thickness provide a pair of annular steps which, in effect, provide a crease to facilitate the folding or collapsing action. The collapsing action is also facilitated by reason of the fact that the maximum and minimum diameters of the tapered intermediate side wall portion create a radial clearance between the lower edge of the upper side wall portion and the upper edge of the lower side wall portion, so that there is minimal frictional engagement between the upper, intermediate and lower side wall portions during collapsing and extending. It has also now been determined that, as a practical matter, the radial clearance which permits the intermediate portion to reverse fold with minimal sliding friction can be determined as a function of the wall thickness of the upper side wall portion, as explained in greater detail herein.

Another feature in each of the disclosed embodiments relates to the provision for a gripping area at the lower end of the lower portion of the peripheral side wall, particularly designed to facilitate the extension of the container from the collapsed position.

It is still another feature of the invention to provide various alternative cap engaging portions at the upper end of the container, and to vary the configuration of the upper side wall portion of the container in a manner which rigidifies the upper portion and which also facilitates movement of the container side wall between collapsed and extended positions. It will be understood that the gripping area and cap engaging portion can be reversed, depending on the particular application.

In a first principal embodiment, the upper side wall portion of the container has a substantially uniform diameter in combination with a relatively rigid (but still flexible) annular rim. The rim itself may have the same or greater thickness dimensions than the upper and lower side wall portions.

In one version of this first embodiment, the rim is formed by a radially outwardly extending shoulder which is joined to the upper edge of the upper peripheral side wall portion. The shoulder, in turn, joins with a substantially inverted L-shaped rim comprising a substantially vertical portion and a radially outwardly directed flange terminating at a free edge. This relatively rigid rim also serves as an attachment point for a snap-on type container cap, and its relative rigidity assists in cap retention despite any flexing of the peripheral side wall portions resulting from, for example, accidental dropping of the container, severe squeezing, etc.

In a modified version of this first principal embodiment, the radially outwardly directed flange portion of the rim is omitted so that a screw thread type cap can be utilized.

In another modified version of this first principal embodiment, the screw thread type connection is replaced by a sliding friction fit.

In each of the above described versions of the first principal embodiment, the cap receiving rim lies outside the diameter of at least the upper and intermediate side wall portions, thus providing a convenient gripping point for the user when extending or collapsing the container.

In still another modified version of this first principal embodiment of the invention, the rim is formed by a radially inwardly inclined shoulder which is joined to an upright annular rim provided with external screw threads for receiving a removable lid. This configuration allows the cap skirt to lie substantially flush with the upper side wall portion of the container when the cap is in place on the container.

In still another version of the first principal embodiment, the upper side wall portion is extended vertically upwardly to the free edge of the side wall, with screw threads provided thereon for receiving the cap. Here, the cap skirt will, of course, lie outside the diameter of the upper side wall portion.

In a second principal embodiment of the invention, the upper side wall portion includes a relatively large radially outwardly extending, hollow annular rib located at the base of the cap receiving rim. The substantially vertical annular cap receiving rim is provided with screw threads for cooperative engagement with mating threads on the interior of the cap skirt. In this second principal embodiment, the cap skirt lies slightly radially inwardly of the outer diameter of the hollow rib when the cap is in place on the container. The radially outwardly projecting hollow rib provides stiffness to the upper end of the container and provides a good gripping point for the user when collapsing or extending the container.

In a third principal embodiment, the upper side wall portion tapers upwardly and outwardly from the intermediate side wall portion, and then upwardly and inwardly to a substantially vertical annular rim provided with screw threads for receiving a cap. When the cap is threadably secured to the container, the cap skirt lies substantially flush with the radially outwardmost surface of the upper peripheral side wall portion of the container.

In all of the embodiments described above, the lower peripheral side wall portion may be telescoped upwardly into the upper peripheral side wall portion, with the intermediate side wall portion reverse folded therebetween. Moreover, in each case, and as noted above, the relative diameters of the upper, intermediate and lower side wall portions are selected to provide adequate axial and radial space to accommodate the telescoping action without excessive friction which would otherwise tend to inhibit the movement between extended and collapsed positions, and vice versa.

It is yet another feature of this invention to provide caps for the container which, as noted above, may be of the snap-on type, screw thread type, or friction fit type. In each case, the cap is provided with an internal skirt which serves to engage and reinforce the annular container rim to provide further insurance of cap retention.

Accordingly, in its broader aspects, the invention relates to a reusable collapsible container comprising a bottom wall and a relatively flexible, peripheral side wall extending upwardly from the bottom wall, the side wall movable between axially extended and collapsed positions and, in the extended position, having lower and upper relatively thicker side wall portions and an intermediate relatively thinner side wall portion, the upper side wall portion formed with an annular rim defining an upper open end of the container, the rim formed with means for receiving a removable cap; and wherein the intermediate side wall portion is tapered downwardly radially inwardly, and the lower side wall portion is tapered downwardly radially outwardly substantially to the bottom wall, such that in the collapsed position, the lower side wall portion is partially telescoped within the upper side wall portion with the intermediate portion reverse folded therebetween, and with an uppermost edge of the lower side wall portion radially spaced away from the upper side wall portion.

In another aspect, the invention relates to a reusable, collapsed container comprising a bottom wall and a peripheral side wall movable between extended and collapsed positions, the side wall in the extended position having upper, lower and intermediate portions, and wherein in the collapsed position, the lower side wall portion is partially telescoped into the upper side wall portion, with the intermediate side wall portion reverse folded therebetween, and wherein the lower side wall portion and the intermediate side wall portion are radially inwardly spaced away from the upper side wall portion.

In still another aspect, the invention relates to a container and cap assembly comprising a container body having a bottom wall and a peripheral side wall extending upwardly from the bottom wall and terminating at an open upper end; the peripheral side wall having upper, intermediate and lower portions, the intermediate portion having a wall thickness substantially less than wall thicknesses of the upper and lower portions; the intermediate portion tapering inwardly in a downward direction and the lower portion tapering outwardly in the downward direction, the upper portion having an annular rim surrounding the open upper end, the annular rim including first means for receiving a removable cap; and a cap having a top wall and a depending skirt, the depending skirt including radially inner and outer rings, the outer ring having second means for cooperating with the first means, and the inner ring engaging an inner surface of the annular rim.

In still another aspect, the invention relates to a reusable collapsible container comprising a bottom wall and a relatively flexible, peripheral side wall extending upwardly from the bottom wall, the side wall movable between axially extended and collapsed positions and, in the extended position, having lower and upper relatively thicker side wall portions and an intermediate relatively thinner side wall portion, the upper side wall portion formed with an annular rim defining an upper open end of the container, the rim formed with means for receiving a removable cap; and wherein the intermediate side wall portion is tapered downwardly radially inwardly, and the lower side wall portion is tapered downwardly radially outwardly substantially to the bottom wall, such that in the collapsed position, the lower side wall portion is partially telescoped within the upper side wall portion with the intermediate portion reverse folded therebetween, and with an uppermost edge of the lower side wall portion radially spaced away from the upper side wall portion, and wherein the radial spacing is determined as a function of the thickness of the upper side wall portion.

The present invention thus provides unique container and cap constructions which are useful for a variety of purposes. It will be appreciated that the container may be advantageously shipped, stocked, and stored between use in the collapsed condition, thus enabling efficient use of space. At the same time, the container is easily expandable to an enlarged volume, and is particularly well suited for the storage of foodstuffs (frozen or refrigerated) or other material.

DETAILED DESCRIPTION OF TEE DRAWINGS

With reference to FIGS. 1-5, an extrusion/blow molded container 10 in accordance with the first principal embodiment of the invention generally includes a bottom wall 12 and a peripheral side wall 14 extending generally upwardly from the bottom wall 12. The container may be made of low density polyethylene (LDPE), polypropylene or other suitable plastic material. In the embodiment described herein, the side wall is generally circular (when viewed in cross sections taken through the container) but it will be appreciated that the container may have other suitable shapes as well. The peripheral side wall terminates at an open upper end 16.

The peripheral side wall 14 in this exemplary embodiment is formed to include three axial portions including an upper portion 18, an intermediate portion 20 and a lower portion 22. The upper and intermediate portions 18 and 20 have generally similar axial lengths, while the lower portion 22 has a somewhat greater axial length for a reason described further below. An exemplary thickness for side wall portions 18 and 22 may be, for example, in the range of about 25 to 60 mil and preferably about 45 mil. The bottom wall 12 may be substantially thicker if desired. The intermediate side wall portion 20 may have a thickness between about 2 and 12 mil and preferably about 8 mil. In any event, it was also further determined that the ratio between the thickness of each of the upper and lower side wall portions to the thickness of the intermediate side wall portion should be at least 3.75 to 1 and preferably about 5 to 1. These ratios are significant in that the absolute thickness values may change depending on container diameter, axial length and hence, volumetric capacity. It will also be appreciated that the thicknesses inherently vary somewhat in each side wall section as a result of the preferred extrusion blow molding process, or other suitable process such as injection molding.

It has now been determined that because of the overall configuration of the sidewall as described below, the wall thickness dimensions can be expanded. For example, the thin intermediate side wall portion 20 can have a wall thickness between about 2 and about 22 mils. The upper and lower side wall portion 22 can have a wall thickness of from about 25 up to about 75 mils or more. At the same time, the ratio between the thicknesses of the upper and lower side wall portions and the intermediate portion can be reduced from at least 3.75 to 1 to at least about 3 to 1. As already mentioned above, the wall thickness dimensions are to be considered as averaged over the specifically identified area of the container given that such thicknesses vary slightly due to the nature of plastic forming techniques.

The uppermost end of the container side wall 14 includes an annular rim adapted to receive a removable cap or lid, and the thickness of this rim area may be the same or greater than the upper side wall portions. While the upper and lower side wall portions 18 and 22 are flexible, they are relatively rigid as compared to the much thinner intermediate portion 20. This arrangement permits easy collapse, extension and re-collapse of the container in a manner described in more detail below.

The three described side wall portions 18, 20 and 22 are separated by a pair of transitional steps 24, 26 which may comprise radially inwardly directed tucks or indentations which result primarily by the changes in wall thickness at each interface between adjacent side wall portions. These steps facilitate the telescoping of the lower side wall portion 22 into the upper portion 18, as well as the reverse folding of the intermediate side wall portion 20 relative to lower side wall portion 22.

The overall configuration of the peripheral side wall also contributes to the ease with which the container may be collapsed and extended. For example, in this first principal embodiment, the upper peripheral side wall portion 18 is substantially cylindrical, i.e., of substantially constant diameter. The intermediate peripheral side wall portion 20, however, tapers in a downward and inward direction, i.e., the diameter of the intermediate portion 20 decreases substantially uniformly in a downward direction. The lower peripheral side wall portion 22 is tapered in the opposite direction, i.e., the diameter of the lower peripheral side wall portion increases substantially uniformly in the downward direction. It will be appreciated, however, that these tapered surfaces can also be curved in the axial direction, i.e., the tapers need not be defined by uniformly decreasing or increasing diameters. This configuration is particularly advantageous in that by applying axially compressive forces on the top and bottom of the container, the lower intermediate portion 22 will readily move upwardly toward the upper peripheral side wall portion 18 while causing the intermediate peripheral side wall portion 20 to reverse fold in the manner best seen in FIG. 4. In this regard, and with specific reference to FIGS. 3 and 4, it will be appreciated that the above described side wall configuration establishes a significant difference in diameters as between the upper side wall portion 18 and the uppermost end of the lower side wall portion 22 (i.e., the smallest diameter of the lower side wall portion). This difference or radial clearance is determined by the degree of taper of the intermediate side wall portion 20, which, in turn, is determined by the maximum and minimum diameters of that portion of the side wall. Exemplary dimensions relating to side wall portion 20 are provided below for containers of varying volumetric capacity, but is in no way intended to limit the size of containers constructed in accordance with this invention.

A. 11 oz. container Max. Dia.: 2.757"Min. Dia.: 2.260"Angle of taper (from vertical): 5.85° Radial clearance: about 0.248"
B. 16 oz. container Max. Dia.: 3.021"Min. Dia.: 2.508"Angle of taper: 5.42° Radial clearance: 0.256"
C. 32 oz. container Max. Dia.: 4.056"Min. Dia.: 3.399"Angle of taper: 6.7° Radial clearance: 0.328"
D. 64 oz. container Max. Dia.: 4.75"Min. Dia.: 4.052"Angle of taper: 5.12° Radial clearance: 0.349"

Figure 4:
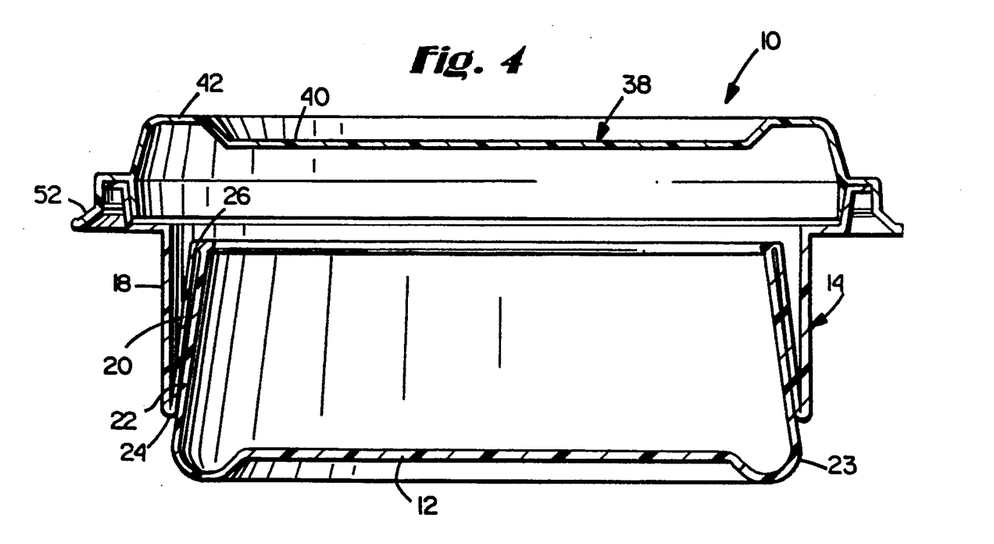
FIG. 4 is a cross section of the container illustrated in FIG. 2, but in the collapsed condition.

It will be appreciated that to obtain the true radial clearances in each case, the thickness of the upper side wall portion 18 must be subtracted from the values given above. It is preferred that these clearances be in the range of from about 0.187 to 0.5 inch, and depending on container size, and wall thickness dimensions, could be in a range of from 0.125 to 2.0 inches. By this arrangement, friction resistance as the lower side wall section telescopes into the upper side wall portion (as well as the reverse movement during extension) is minimized. In fact, as best seen in FIG. 4, neither the lower side wall portion 22 nor the intermediate portion 20 are in radial contact with the interior surface of the upper side wall portion 18 when the container is collapsed.

It has now been determined that another way of determining the necessary radial clearance is make that clearance a function of the thickness of the upper side wall portion. Since the outside diameters of the upper and lower side wall portions 18 and 22 are determined by the mold surface, the variable which becomes critical here is the inside diameter of the upper side wall portion 18. For essentially all practical applications of the invention, it has been determined that a desired radial gap (which determines the ease with which the container is collapsed and/or expanded) should be between about 3 and about 10 times the wall thickness of the upper portion 18. For example, for a 24 oz. container having an upper side wall portion thickness of 0.048" (+0.008 or −0.000), the radial gap as defined hereabove should be about 0.250".

Figure 1:
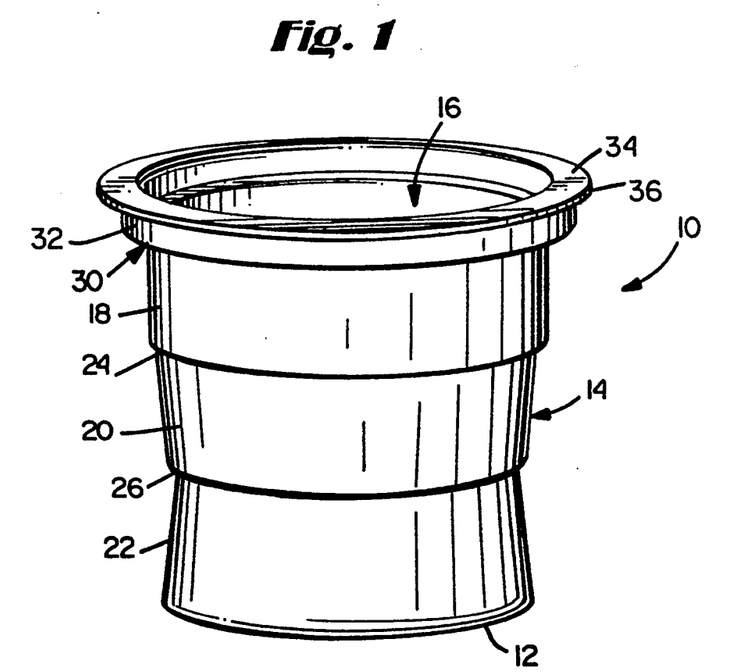
FIG. 1 is a perspective view of a container in accordance with a first principal embodiment of the invention.
Figure 2:
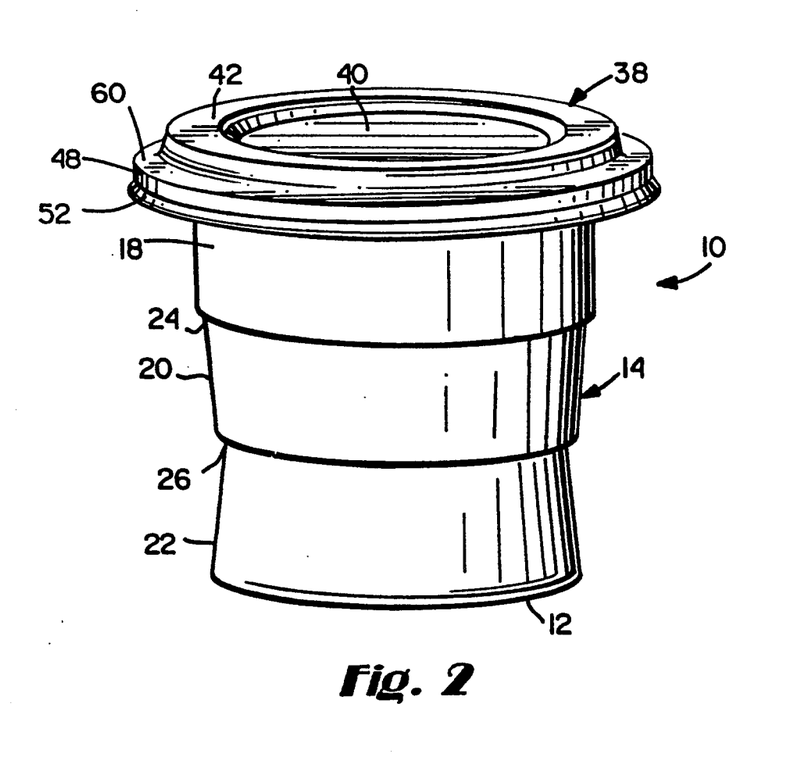
FIG. 2 is a perspective view of the container illustrated in FIG. 1 but with a cap applied thereto.
Figure 3:
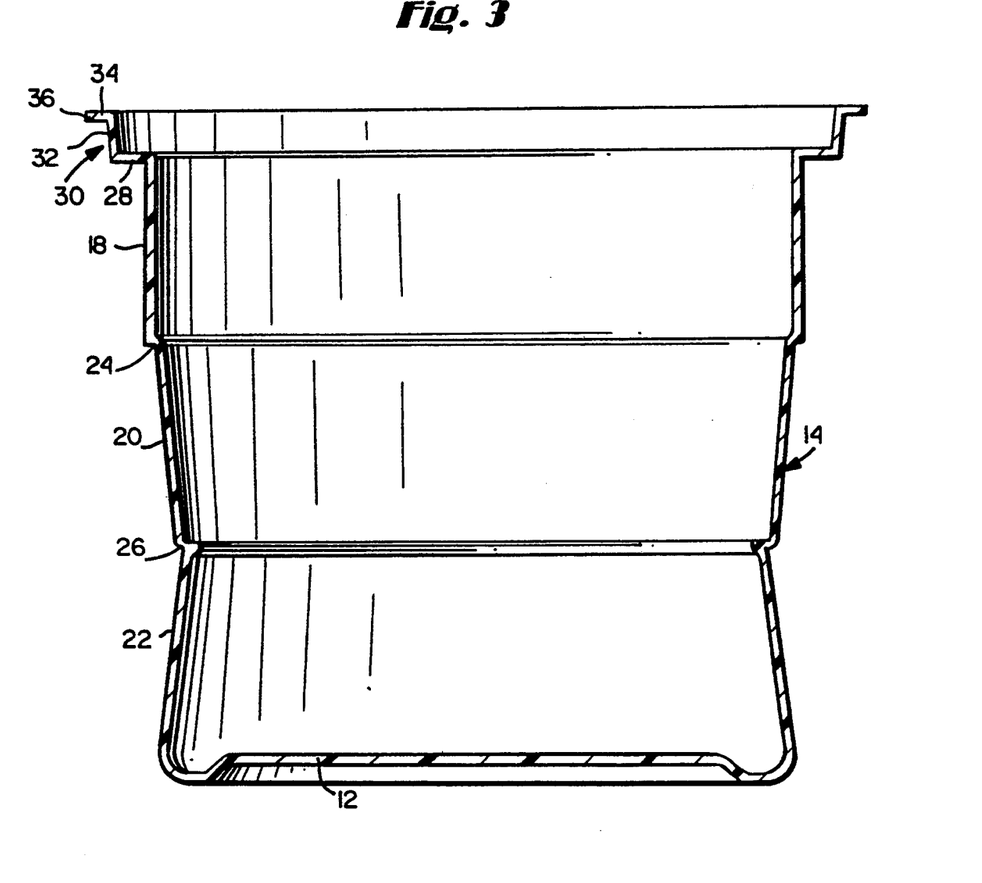
FIG. 3 is a cross section of the container illustrated in FIG. 1.

By reason of the extended length and the downward, outward taper of the lower side wall portion 22, when the intermediate portion 20 is fully reversed with the lower portion 22 telescoped into the upper section 20, there remains exposed a lower end 23 (see FIGS. 4) of the lower portion 22 which provides a good grasping point for the user for exerting a pull on the container to re-expand the latter to the extended position illustrated in FIG. 1. Thus, the tapered lower side wall portion (the upper diameter of which is controlled by the degree of taper of the intermediate side wall portion 20) performs a threefold function of 1) permitting the lower side wall portion to telescope easily into the upper side wall portion 18; 2) providing good stability for the container in a design which would otherwise tend to decrease stability through increasing diameter reductions toward the lower end of the container; and 3) providing a readily accessible gripping point for the user to exert pushing and pulling forces at opposite ends of the container.

Figure 5:
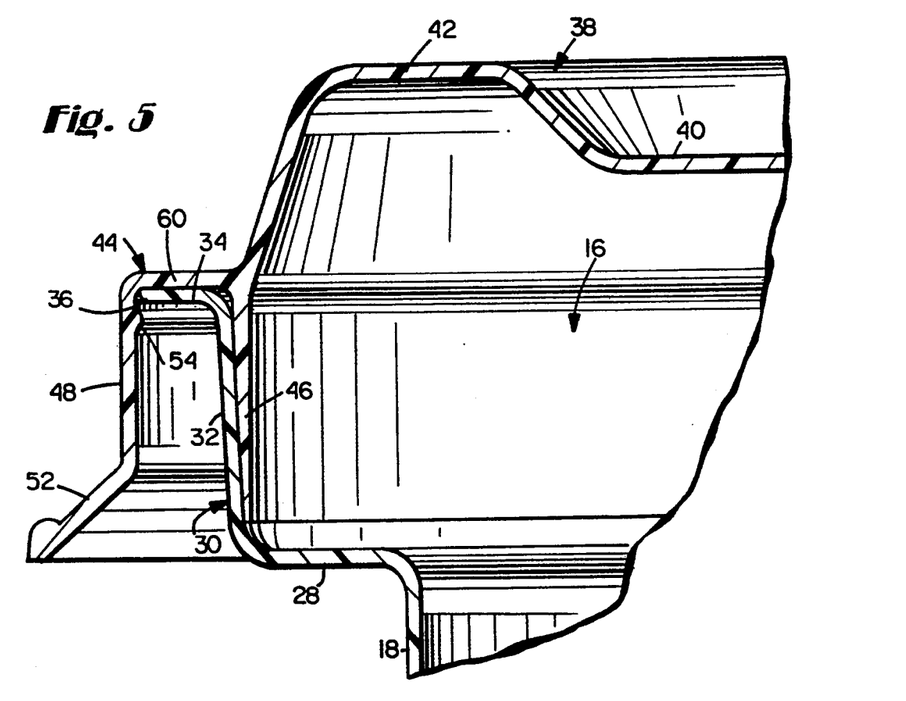
FIG. 5 is a partial section view illustrating the manner of connection of the cap and container shown in FIG. 2.

With reference now particularly to FIG. 5, the open upper end 16 of the container 10 is formed with a radially outwardly extending shoulder 28 joined to the upper edge of the upper peripheral side wall portion 18. The shoulder 28 joins with a substantially inverted L-shaped rim 30 comprising a substantially vertical stem portion 32 and a radial flange 34 terminating at an outer peripheral edge 36 to thereby form an annular cap or lid receiving rim.

The shoulder 28, vertical stem 32 and radial flange 34 may be of generally the same or greater thickness as the upper and lower side wall portions 18 and 22, but may vary somewhat depending on how the upper end of the container is formed, i.e., blown along with the side wall or compression formed.

An associated cap 38 in this first principal embodiment includes a center disc area 40 including a peripheral, upstanding hollow rib 42, and a depending skirt 44 which has a substantially inverted U-shape. Thus, the skirt includes an inner annular skirt portion 46 and a radially outer annular skirt portion 48, connected by an annular, horizontal web 60. The outer annular skirt portion 48 terminates at an outwardly angled gripping edge 52 which may extend completely (or only partially) about the cap 38.

The outer annular skirt 48 is also provided with an inwardly directed annular projection or lug 54 below and substantially adjacent the web 50.

In use, the cap 38 is pressed onto the container such that the lug 54 snaps over the peripheral edge 36 of the container rim 30. This may be accomplished by pressing one portion of the cap 38 onto the container 10 and then progressively applying a compressive force (between the cap and the container rim) about the periphery of the container 10 until the cap 38 is fully and securely attached to the container. At the same time, the inner annular skirt portion 46 engages the interior of the vertical stem portion 32, substantially continuously about the container, and is preferably in radial compression therewith. The relative rigidity of the upper container rim 30 and the compressive engagement between the inner annular skirt portion 46 and the vertical portion 32 of the container rim insures secure attachment of the cap 38 to the container 10. By this arrangement, the cap 38 will not become dislodged from the container 10 as a result of flexing of the container side wall, or upon impact from accidental dropping, etc.

Figure 6:
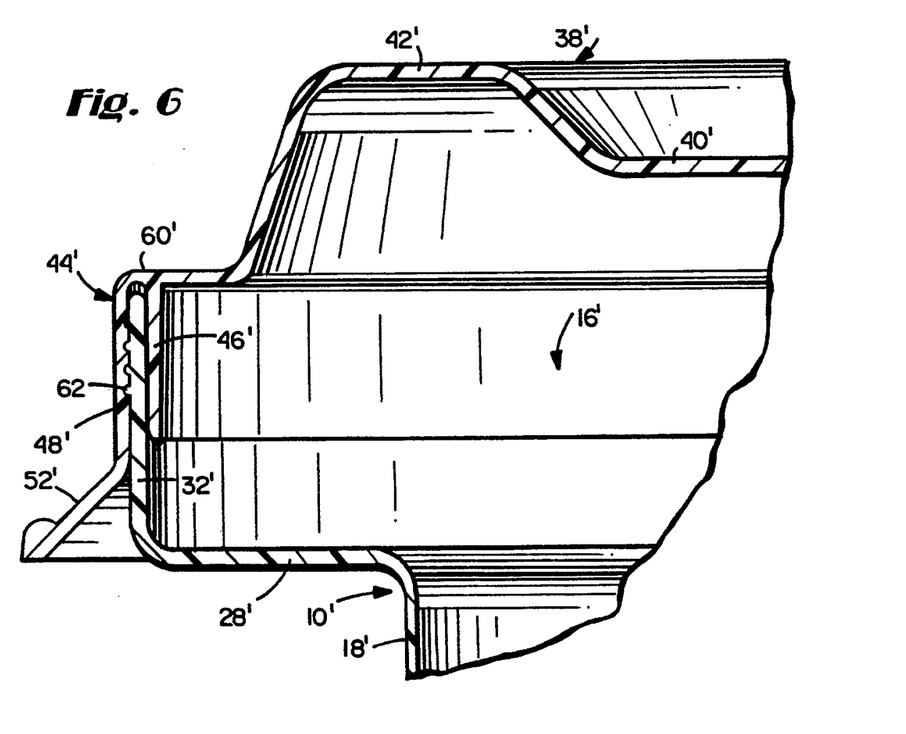
FIG. 6 is a partial cross section showing a manner of attachment between a cap and a container in accordance with a modified version of the embodiment illustrated in FIGS. 1-5.

With reference now to FIG. 6, a modified version of this first embodiment includes a cap 38 of the screw-on type. More specifically, the open upper end 16' of the container 10' is formed with a radially outwardly extending shoulder 28' joined to the upper edge of the upper peripheral side wall portion 18'. The shoulder 28' joins with a substantially vertical annular stem 32' provided with screw threads 62 about the exterior surface thereof. The cap 38' includes a center disc area 40' including a peripheral hollow rib 42', and a depending skirt 44' which again has a substantially inverted U-shape. Specifically, the skirt portion includes an inner annular skirt portion 46' and a radially outer annular skirt portion 48' connected by a horizontal annular web 50'. The web 50' has a radial width which is substantially the same as the wall thickness of stem 32' to provide flush engagement between the inner and outer skirt portions 46', 48' and the stem 32'. The outer annular skirt portion 48' terminates at an outwardly angled gripping edge 52' which, as in the previously described embodiment, may extend completely about the cap.

The outer annular skirt 48' is provided with screw threads 64 on its interior surface which are adapted to cooperate with the screw threads 62 provided on the exterior surface of the vertical stem 32'. The cap 38' may be screwed onto the container 10' in the conventional fashion, and the inner annular skirt portion 46' will engage the interior surface of the stem 32' to reinforce the same and prevent dislodgement of the cap 38' in substantially the same manner as the inner depending skirt portion 46' of the earlier described embodiment.

Figure 7:
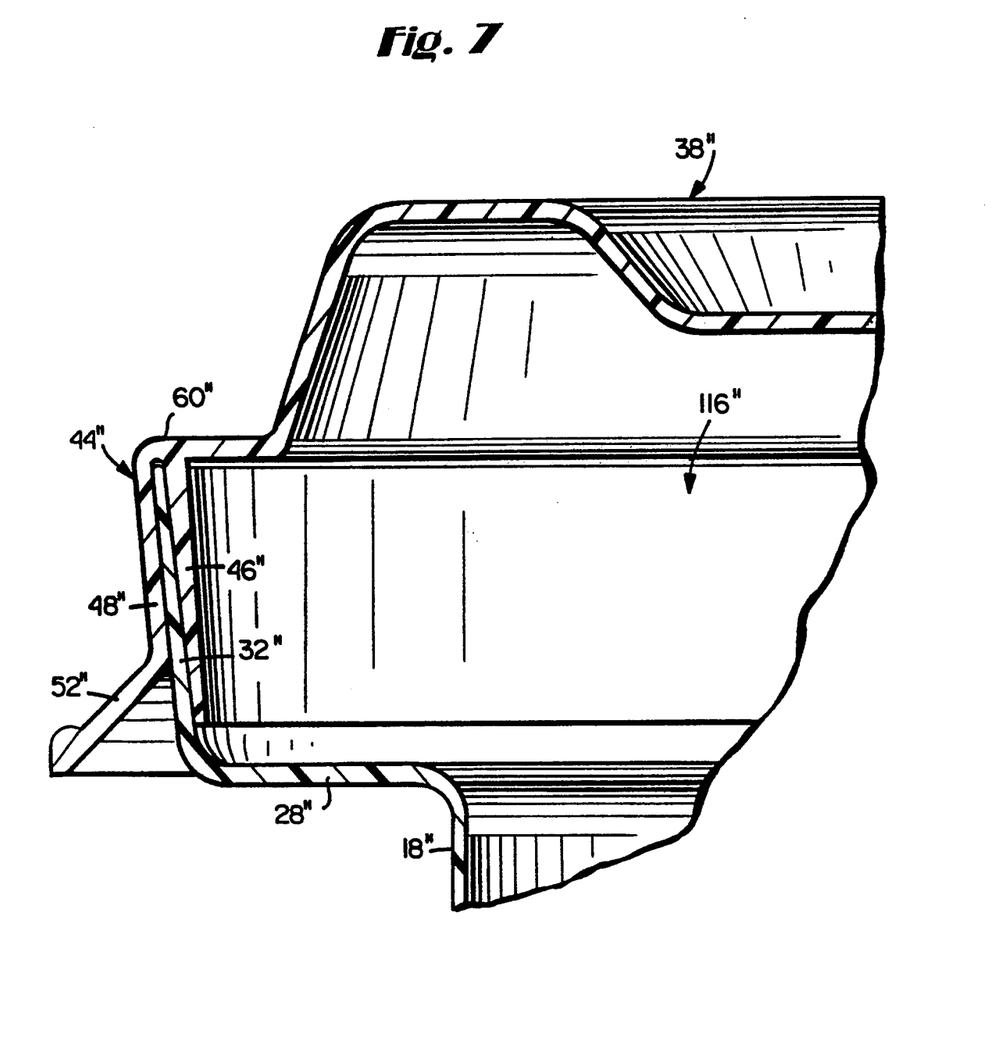
FIG. 7 is a partial cross section showing a manner of attachment between a cap and a container in accordance with another modified version of the embodiment illustrated in FIGS. 1-5.

In FIG. 7, another version of the first principal embodiment is shown. Here, the container rim comprises simply a radially outward web or shoulder 28" and an upward and slightly outwardly tapered extension 30". Cap 38" is formed with inner and outer depending skirts 46" and 48" which form a groove which may be pressed onto the stem 32" in a relatively tight frictional engagement. In other words, this embodiment is similar to the embodiment illustrated in FIG. 6, but the screw threads have been omitted in favor of a sliding type friction fit.

It will be appreciated that other manners of attachment of the cap to the container may be employed so long as means such as the inner skirt portions (46, 46' and 46") are provided for reinforcing the rim of the flexible container to insure retention of the cap on the container under abnormal conditions such as accidental dropping of the container, severe squeezing of the container side wall, and other events which might otherwise result in flexing or temporary elastic deformation of the container rim and resulting dislodgement of the cap.

Figures 8, 8A:
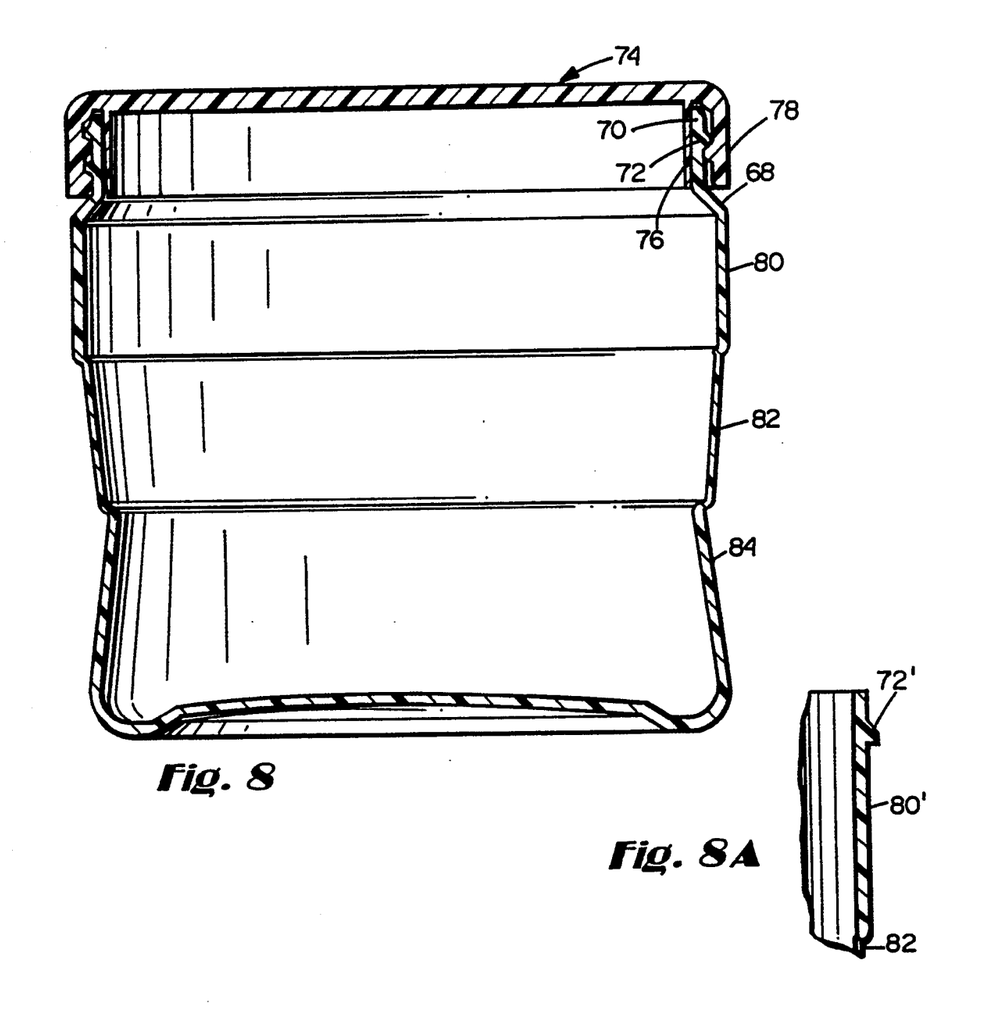
FIG. 8 is a side section of another modified version of the embodiment illustrated in FIGS. 1-5.
FIG. 8A is a partial section of a variation of the embodiment disclosed in FIG. 8.

Referring now to FIG. 8, another version of the first principal embodiment is illustrated wherein the annular rim at the open upper end of the container includes a radially inwardly and upwardly tapered shoulder 68 and a vertically extending stem 70 provided with screw threads 72 for threadably receiving a cap 74. The cooperation between the cap inner and outer skirt portions 76, 78 and the stem 70 remains as previously described.

When the removable lid or cap 74 is applied to the container, the outer annular skirt 78 lies substantially radially flush with the upper peripheral side wall portion 80, thus presenting a smooth transition from cap 74 to upper side wall portion. The container configuration including the intermediate side wall portion and lower side wall portion, and the various dimensions thereof are otherwise similar to the previously described versions and therefore need not be further discussed.

Figure 9:
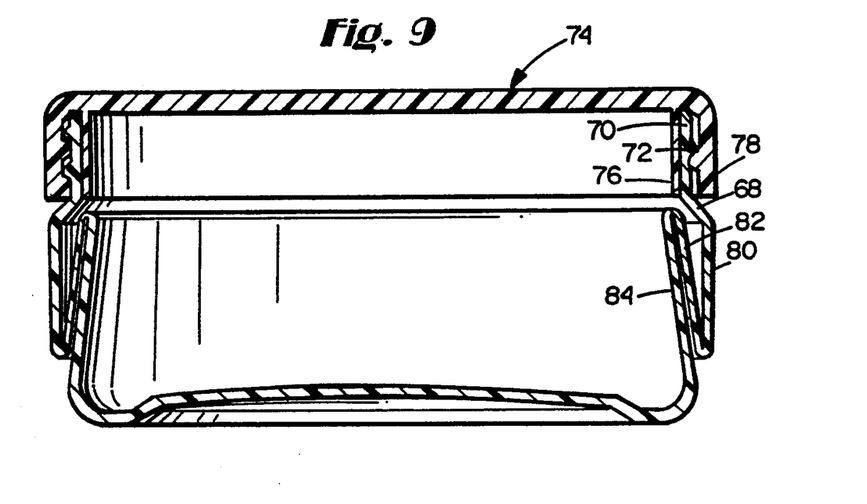
FIG. 9 is a side section view of the container illustrated in FIG. 8 but in a collapsed position.

With specific reference to FIG. 9, it will be appreciated that when the container is axially compressed to the collapsed position, there is sufficient space, both radially and axially within the upper peripheral side wall portion 80 to accommodate both the lower peripheral side wall portion 84 and the intermediate side wall portion 82 without interference from the shoulder 68.

An alternative upper side wall design is shown in FIG. 8A where the upper side wall portion 80' extends substantially uniformly from the intermediate side wall portion 82 to the exterior screw thread 72'. The cap in this version will, of course, extend radially beyond the upper side wall portion 80'.

Figure 10:
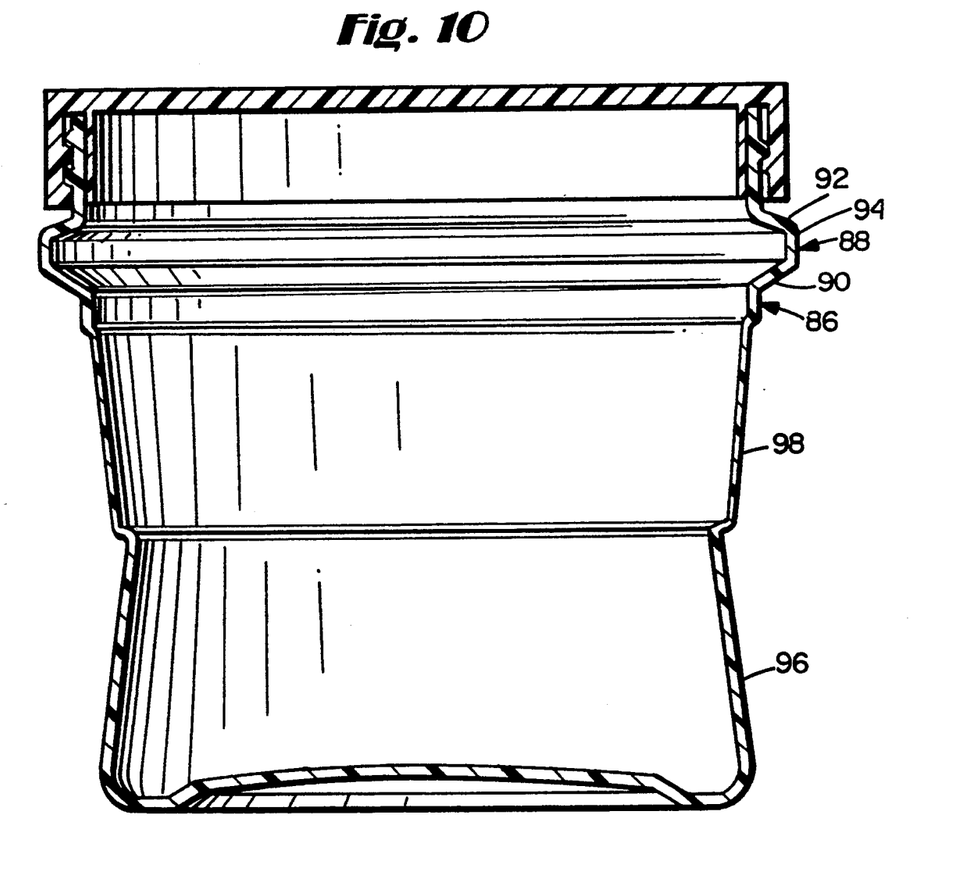
FIG. 10 is a side section of a container in accordance with a second principal embodiment of the invention.
Figure 11:
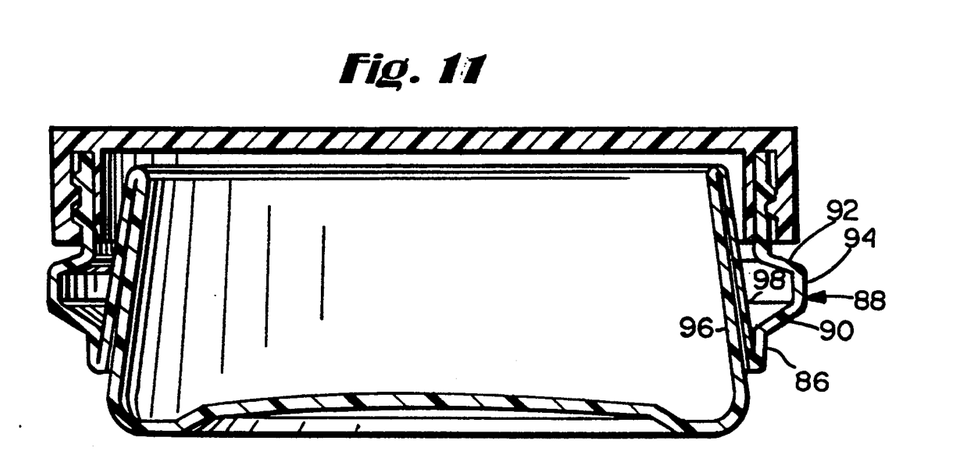
FIG. 11 is a side section of the container illustrated in FIG. 10 but in the collapsed position.

Turning to FIGS. 10 and 11, a second principal embodiment of the invention is illustrated. In this second principal embodiment, the upper peripheral side wall portion 86 is formed with a radially outwardly extending hollow rib 88 which includes oppositely tapered portions 90, 92 and an outermost substantially vertical portion 94. This hollow rib 88 is located intermediate the upper and lower ends of the upper peripheral side wall portion 86. Incorporation of the rib 88 is particularly advantageous in that it provides a convenient gripping point for the user for purposes of both collapsing and extending the container. With reference to FIG. 11, it is again readily apparent that in the collapsed position, the side wall configuration is such that the upper side wall portion 86 easily accommodates the lower peripheral side wall portion 96 and the intermediate peripheral side wall portion 98 in the collapsed position without interference, in the same manner as in the previously described embodiment.

Figure 12:
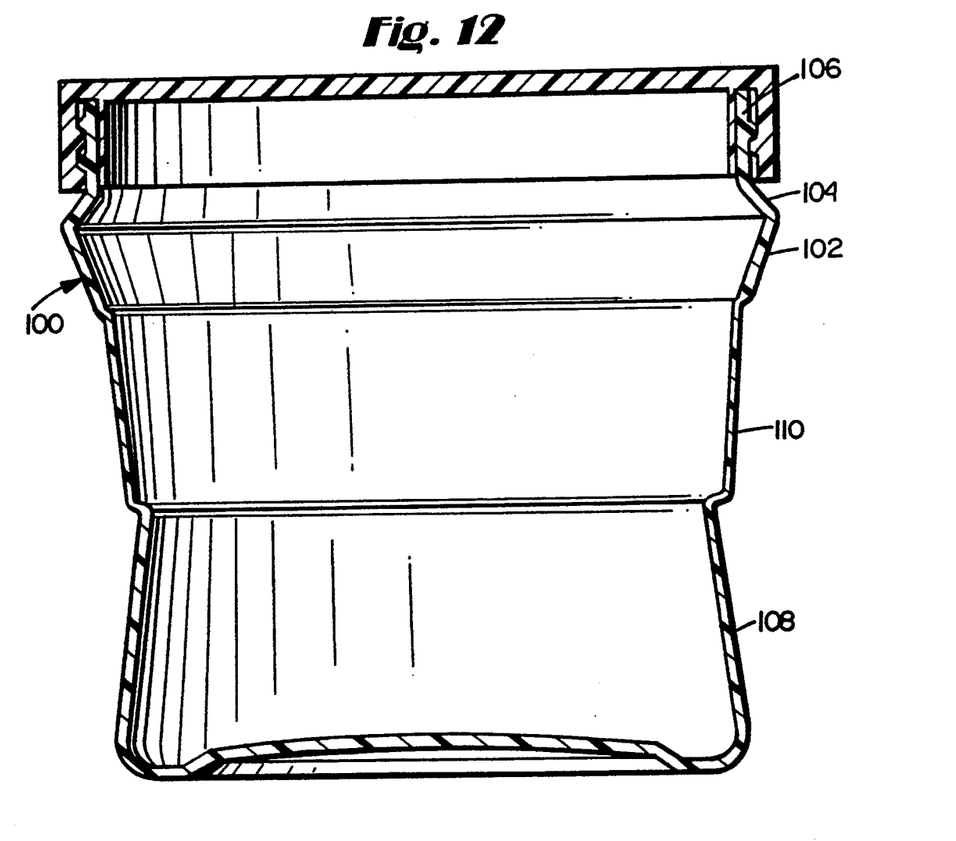
FIG. 12 is a side section of a container in accordance with a third principal embodiment of the invention.
Figure 13:
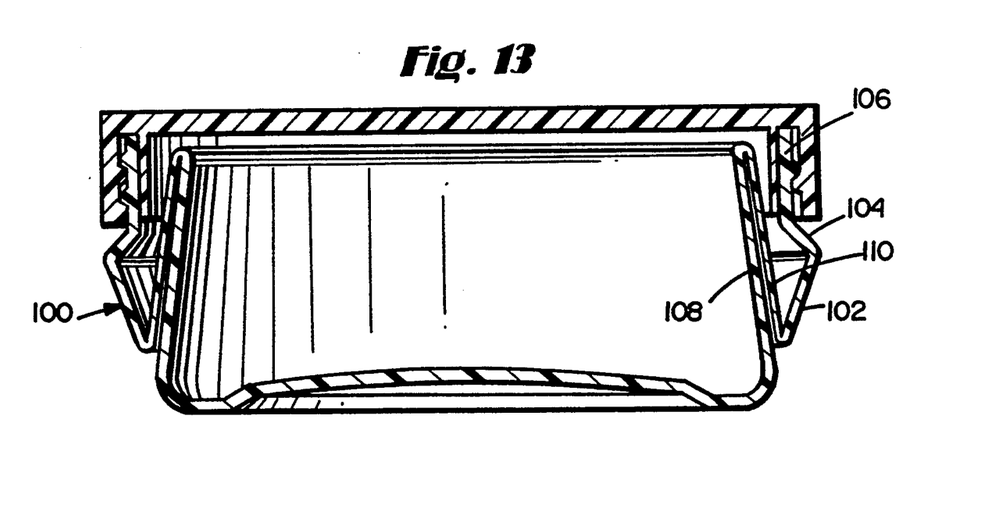
FIG. 13 is a side section of a container illustrated in FIG. 12, but in the collapsed position.

Turning now to FIGS. 12 and 13, a third principal embodiment of the invention is illustrated, wherein the upper peripheral side wall portion 100 is reconfigured to include an upwardly and outwardly tapered portion 102 which is joined to a radially inwardly tapered portion 104. Surface 102 joins to the upright annular rim 106, also provided with external screw threads as previously described. Here again, the tapered surface 102 of the upper peripheral side wall portion 100 provides a good gripping surface for the user to facilitate collapse and extension of the container between the extended position illustrated in FIG. 12 and the collapsed position illustrated in FIG. 13. As in the case of the two previously described embodiments, the configuration of the upper peripheral side wall portion 100 leaves more than enough axial and radial space to accommodate the lower peripheral side wall portion 108 and the intermediate peripheral side wall portion 110 in the collapsed position. Otherwise, the intermediate and lower side wall portions 110, 108, respectively, are substantially identical to the previously described embodiments.

The above described configurations for the upper side wall portions of the container are intended to be exemplary and the invention is not intended to be limited thereto.

The above described containers may be utilized for a variety of purposes. For example, a container may be shipped empty from a manufacturer for filling with foodstuffs or other material at another location. The container may also be sold to consumers empty as a storage container for foodstuffs and/or other materials. In the latter instance, the container is particularly advantageous in that it may be collapsed and efficiently stored during shipping and between use.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed:

1. A reusable collapsible container comprising:
a bottom wall and a relatively flexible, peripheral side wall extending upwardly from said bottom wall, said side wall movable between axially extended and collapsed positions and, in the extended position, having lower and upper relatively thicker side wall portions and an intermediate relatively thinner side wall portion; and wherein said intermediate side wall portion is tapered downwardly radially inwardly, and said lower side wall portion is tapered downwardly radially outwardly substantially to said bottom wall, such that in said collapsed position, said lower side wall portion is partially telescoped within said upper side wall portion with said intermediate portion reverse folded therebetween, and with an uppermost edge of said lower side wall portion radially spaced away from said upper side wall portion, and wherein the radial spacing is determined as a function of the thickness of the upper side wall portion.

2. The container of claim 1 wherein the radial spacing is between about 3 and about 8 times the thickness of the upper side wall portion.

3. The container of claim 2 wherein the thickness of the intermediate portion is between about 2 and about 20 mils.

4. The container of claim 2 wherein a ratio of upper and lower side wall portion wall thickness to intermediate side wall portion wall thickness is at least 3 to 1.

5. The container of claim 1 wherein the radial spacing is between about 3 and about 10 times the thickness of the upper side wall portion, and the thickness of the intermediate portion is between about 2 and about 20 mils, and further wherein a ratio of upper and lower side wall portions to the thickness of the intermediate side wall portions is at least 3 to 1.

* * * * *